United States Patent Office 3,230,242
Patented Jan. 18, 1966

3,230,242
CYCLIC NITROGEN-SILICON COMPOUNDS
Walter Fink, Zurich, Switzerland, assignor to Monsanto Company, a corporation of Delaware
No Drawing. Filed Jan. 26, 1962, Ser. No. 169,115
Claims priority, application Switzerland, Jan. 26, 1961, 933/61
9 Claims. (Cl. 260—448.2)

The present invention relates to new and useful cyclic nitrogen-silicon compounds and to a process for making these compounds. The new compounds have the general formula

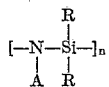

In this formula A signifies a $R'_3Si-$ group or, but not exclusively, a hydrogen atom, R and R' are identical or different aliphatic, cycloaliphatic, araliphatic, aromatic or heterocyclic radicals which possibly can be fluorinated. Thereto, R' can also be a halogen atom or a $(R_3Si)_2N$-group and $n$ is an integer, being generally small and preferably 2, 3 or 4. Normally it is preferred that R and R', if a hydrocarbon radial, each have not more than 18 carbon atoms, and more preferably not more than 8 carbon atoms.

The new compounds are obtainable by the reaction of cyclic diorganosilazane salts, preferably alkali salts, and silicon salts or organosilicon salts, preferably halogen salts, which contain the mentioned radicals according to the scheme:

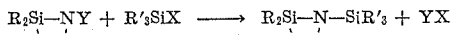

The radicals R and R' have in this equation the same significance as above. X is an acid anion, preferably a halogen atom, and Y is a metal atom, preferably an alkali metal atom or a radical forming a Grignard compound.

The cyclic diorganosilazanes serving as starting compounds are prepared in known manner from diorganosilicon dihalogenides and water-free ammonia at Dry-Ice temperature, or ammonia in benzene, carbon tetrachloride, ether, etc. There are mainly formed cyclic trimeric and tetrameric diorganosilazanes of the formulate

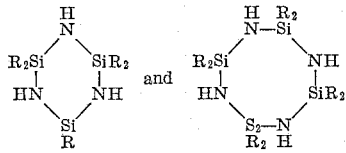

However, smaller and bigger rings are just as suitable for the preparation of the new end products.

Examples of appropriate starting compounds are hexamethyl-, hexaethyl-, hexapropyl-, hexabutyl-, hexaoctyl-, hexalauryl-, hexabenzyl- hexacyclohexyl-, hexaphenyl-, hexatolyl-, hexanaphthylcyclotrisilazane-, cyclotetrasilazane etc. Furthermore, the cyclosilazanes which contain fluorinated lower aliphatic radicals such as —$CF_3$, —$CH_2CF_3$, —$CF_2CF_3$ etc., or perfluorinated aromatic radicals such as —$C_6F_5$, —$C_{10}F_8$ etc. are especially important in the production of high temperature resistant compounds.

The preparation of the necessary metal salts such as potassium, sodium, lithium salts, etc. or Grignard compounds can be done by conventional methods.

Suitable silicon compounds which can be reacted with the cited cyclosilazanes to give the compounds of invention are particularly triorganosilicon halides such as, for example, trimethyl- triethyl-, tripropyl-, tributyl-, trioctyl-, trilauryl-, tribenzyl-, tricyclohexyl- triphenyl, tritolyl-, trinaphthylsiliconchloride, -bromide, -fluoride etc. The fluorinated radicals enumerated above, are also here important in the production of high temperature resistant end products.

It is understood, that in addition to halogenides, other salts of organosilicons as, for example, sulfates, nitrates etc. may be used in this reaction, but the easily available halogenides are generally preferred from the teachnical point of view. Furthermore, unsymmetrically substituted organic silicon salts, i.e., compounds which show different organic radicals linked to the silicon atom, likewise are suitable.

According to the definition given before, the radicals R' attached to the silicon atom of the substituents to be introduced, can also be halogen atoms. The preparation of cyclic silazanes which possess as N-substituent a $Cl(R')_2Si-$, $Cl_2(R')Si-$ or even a $Cl_3Si-$ group is more difficult, since ring connection, or polymerization respectively, readily occours. In such cases, in order to avoid this, the diorganocyclosilazane salts are gradually added to an excess of silicon tetrahalides or organosilicon mono-, di- or trihalides, and/or silicon halides are used such as for example $SiF_3Cl \cdot R'SiF_2Cl$, $Ri'SiFCl_2$, $R'_2SiFCl$, $SiCl_3Br$, $R'SiCl_2Br$, $R'_2SiClBr$ etc., whose halogen atoms display a different activity.

According to the given definition, all or a part of the radicals R' on the silicon atom of the substituents to be introduced can also be a $(R_3Si)_2N$-group. Such reactants, having for example only disilylamine groups correspond to the formulae $[(R_3Si)_2N]SiCl_3$,

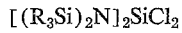

and $[(R_3Si)_2N]SiCl_3$. They can be prepared from silicon halides or, when the radicals R' represent mixed substituents, also from organosiliconhalides and hexaorganodisilazane salts according to copending application Serial Number 150,210, filed November 6, 1961. The stoichiometric ratio of the reactants hereby is chosen so that at least one halogen atom is maintained. For example, according to the scheme

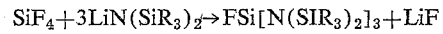

In the reaction of cyclic diorganosilazanes salts and mentioned silicon compounds, the hydrogen atoms, or alkali metal atoms or Grignard radicals respectively, attached to the nitrogen atoms of the ring, can be replaced totally or partially by the $R'_3Si-$ substituents. Preferably, the stoichiometric ratio of the reacted partners is selected, so that either all nitrogen atoms of the ring receive a substituent, or that at maximum one hydrogen atom remains. In the latter case the remaining —NH— group is, as a rule, the weakest place of the heterocyclic ring at which can be effected a ring opening by various agents such as, for example, water, hydroxy compounds, hydrogen cyanide, etc. Thereby, new non-cyclic diorganosilazanes are formed, which possess as endgroups, for example, —$Si(R_2)OH$, —$Si(R_2)OR$, —$Si(R_2)CN$, etc.

The preparation of the cyclic nitrogen-silicon compounds of invention is effected in simple manner by mixing the reactants in the proportions calculated. The reaction can be carried out with or without a solvent. In general, it is expedient to work without a solvent under exclusion of oxygen and under pressure. It is preferred to carry out the reaction at temperatures in the range of 100° to 250° C., more preferably at temperatures of 130° to 200° C.

It is well known that the Si—NH bond is not very stable towards hydrolysis. By the substitution with R'$_3$Si— groups according to the invention, the new compounds attain an unusual stability.

It is noteworthy that in comparison with the starting compounds, i.e., cyclosilazanes, the boiling point is as a rule increased for about 150–200° C., while at the same time the melting point, or solidifying point, respectively, is considerably decreased. The properties can widely be varied by suitable selection and combination of the substituents R and R'.

The products of the process are liquid or solid according to the organo groups. They are mostly distillable. Depending on the circumstances, for the purification it may be sufficient to wash out with water the co-formed alkali or magnesium salts.

The endproducts can be used as heat transferring liquids at high temperatures, lubricants for machine parts which are thermally highly stressed, hydraulic oils, auxiliary agents for textiles, antifoaming agents, antioxidants, stabilizers, vulcanizer accelerators, plasticizers, hydrophobic agents, flameproofing agents for other products, etc. So far as replaceable halogen atoms attached to silicon are still present, the compounds are valuable intermediates. They can be converted in common manner to the corresponding organosilazane silanols, or to their dimeric or polymeric condensation products respectively, by hydrolysis with a calculated amount of water, or alkali solution. According to what is present, one, two or three halogen atoms which can be hydrolyzed, there can be formed one of the following compounds

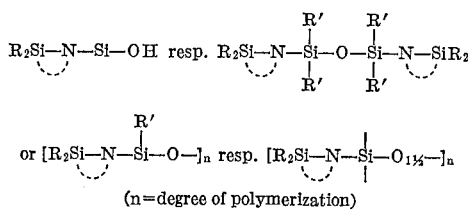

(n = degree of polymerization)

EXAMPLE 1

The trilithium salt is prepared in conventional manner from hexamethylcyclotrisilazane [(CH$_3$)$_2$SiNH]$_3$ and Butyl lithium in n-hexane or benzene. A mixture of hexamethylcyclotrisilazane trilithium salt [(CH$_3$)$_2$SiNLi]$_3$ and trimethylsilicon chloride in a molar ratio of 1:3 is heated in an autoclave under exclusion of oxygen and moisture at 130° C. for 5 hours. Then, the reaction product is fractionated.

Yield 70%; liquid down to −75° C.; B.P. 268–270° C./723 mm. or 159–160° C./42 mm.; $n_D^{20}$ 1.4423.

Analysis.—C$_{15}$H$_{45}$N$_3$Si$_6$ (436.1):

| Percent | Calcd. | Found |
|---|---|---|
| C | 41.33 | 40.5 |
| H | 10.4 | 10.28 |
| N | 9.64 | 9.58 |

EXAMPLE 2

A mixture of hexaphenylcyclotrisilazane trilithium salt [(C$_6$H$_5$)$_2$SiNLi]$_3$ and trimethylsilicon chloride in a molar ratio of 1:3 is heated in an autoclave under exclusion of oxygen and moisture at 150° C. for 15 hours. Then, the recation product is fractionated.

Yield 73%; white plastic mass, softening point about 120° C.; B.P. 272–275° C./5×10$^{-2}$ mm. or 422±5° C./718 mm.

Analysis.—C$_{45}$H$_{57}$N$_3$Si$_6$ (808.5):

| Percent | Calc'd. | Found |
|---|---|---|
| C | 66.85 | 67.32 |
| H | 7.12 | 7.42 |
| N | 5.20 | 5.32 |

EXAMPLE 3

A mixture of octamethylcyclotetrasilazane trilithium salt [(CH$_3$)$_2$SiNH—[(CH$_3$)$_2$SiNLi]$_3$] and trimethylsilicon chloride in a molar ratio of 1:3 is heated in an autoclave under exclusion of oxygen and moisture at 150° C. for 5 hours. Then, the reaction product is fractionated.

Yield: 55%; liquid down to −55° C.; B.P. 325–328° C./718 mm.; $n_D^{20}$ 1.4582.

Analysis.—C$_{17}$H$_{52}$N$_4$Si$_7$ (509.3):

| Percent | Calcd. | Found |
|---|---|---|
| C | 40.08 | 40.45 |
| H | 10.29 | 10.25 |
| N | 11.03 | 11.3 |
| Si | 38.61 | 38.95 |

EXAMPLE 4

A sample of 18.7 g. of hexamethylcyclotrisilazane (85.5 mmol) in 50 ml. of n-hexane is reacted first with 30 ml. of n-butyl-lithium (5.68 N) and then with 18.5 g. (CH$_3$)$_3$SiCl (171.0 mmol). Reaction requirements: 130° C./5 hours. Conversion: LiCl 7.25 g. (100%). Fractionation of the filtrate of the reaction mixture yielded 28 g. of (Compound No. A) N,N'-bis-(trimethylsilyl)-hexamethylcyclotrisilazane (83.9%).

EXAMPLE 5

The lithium salt from 29.1 g. of hexamethylcyclotrisilazane (133.0 mmol) in 250 ml. of n-hexane and 70 ml. of n-butyl-lithium (5.68 N) are allowed to react in an autoclave for 8–9 hours at 150° C. with 43.2 g. (CH$_3$)$_3$SiCl (399.0 mmol). With a conversion: 98% (LiCl 16.5 g.), 38.2–40.5 g. of N,N',N''-tris-(trimethylsilyl)-hexamethylcyclotrisilazane (Compound No. B) is obtained, along with 10.5 g. of N,N'-bis-(trimethylsilyl)-hexamethylcyclotrisilazane (Compound No. A). In one experiment, yet another compound with a B.P.$_3$ 123° C., M.P. 64° C., molecular weight 422 and an IR spectrum identical with that of Compound No. B was obtained.

EXAMPLE 6

A sample of 24.9 g. of octamethylcyclotetrasilazane (85.2 mmol) is dissolved in 150–200 ml. of n-hexane and 15 ml. of n-butyl-lithium (5.68 N) is added dropwise. After reaction with 9.25 g. (CH$_3$)$_3$SiCl (85.2 mmol) at 150° C./6 hours, the conversion is 78% (2.8 g. of LiCl). After two careful fractionations there were obtained 4.0 g. (12.9% of Compound No. C) N-trimethylsilyl-octamethylcyclotetrasilazane, 9.45 g. (30.5%) of (Compound No. D) N,N'-bis-(trimethylsilyl-octamethylcyclotetrasilazane and 11.03 g. (35.8%) of octamethylcyclotetrasilazane.

EXAMPLE 7

To 24.9 g. (85.2 mmol) of octamethylcyclotetrasilazane in 150–200 ml. of n-hexane is added 30 ml. of n-butyl-lithium (5.68 N), and after the addition of 18.5 g. $(CH_3)_3SiCl$ (170.2 mmol) the mixture is placed in an autoclave at 150–160° C. for 6 hours. The weight of LiCl obtained is 6.75 g. (93%). After two fractionations N,N' - bis - (trimethylsilyl) - octamethylcyclotetrasilazane (Compound No. D) is obtained in a yield of 78.5% (29.4 g.). A 4.3 g. polymeric residue is also obtained.

EXAMPLE 8

A sample of 24.9 g. of octamethylcyclotetrasilazane (85.2 mmol) is dissolved in 200 ml. of n-butyllithium (5.68 N), and is reacted with 27.7 g. of $(CH_3)_3SiCl$ (256 mmol), resulting in a conversion of 93% and 23.9 g. (55%) of (Compound No. E) N,N'N''-tris-(trimethylsilyl) - octamethylcyclotetrasilazane. The presence of Compounds Nos. D and F was also shown in the first fraction in a gas chromatogram.

150° C. for 6 hours. Fractional distillation gave (Compound H) N,N',N'' - tris - (dimethylchlorosilyl) - hexaphenylcyclotrisilazane (92.5%). The Compound H can be distilled at normal pressure. It has a boiling point of 470–480° C.

The analytical data for products of Examples 4 through 11 are summarized in Tables 1 and 2 which follow:

Table 1

| Comp. No. | B.P., ° C. | Hg, mm. | $n_D^{20}$ | $D_4^{20}$ | M.P., ° C. |
|---|---|---|---|---|---|
| A | 81.0–82.7 | 2 | 1.4422 | 0.973 | −74 |
| B | 143–145 | 0.9 | 1.4823 | 0.940 | −43 |
| C | 107–108.5 | 1.5 | 1.4613 | -------- | −17 |
| D | 122–124 | 3 | 1.4497 | 0.901 | −32 |
| E | 132–133 | 3 | 1.4582 | -------- | −55 |
| G | 293–300 | 1 | -------- | -------- | 80 |
| F | 85 | 7 | -------- | 0.998 | 38–39 |
| H | 323–325 | 0.6 | -------- | -------- | -------- |

Table 2

| Compd. No. | Empirical formula | Mol. wt. | | Percent C | | Percent H | | Percent N | | Percent Si | |
|---|---|---|---|---|---|---|---|---|---|---|---|
| | | Calcd. | Found | Calcd. | Found | Calcd. | Found | Calcd. | Found | Calcd. | Found |
| A | $C_{12}H_{37}N_3Si_5$ | 363.9 | 353, 360 | 39.60 | 40.06 | 10.25 | 10.41 | 11.54 | 11.39 | 38.59 | 38.10 |
| B | $C_{15}H_{45}N_3Si_6$ | 436.0 | 439, 441 | 41.31 | 41.86 | 10.40 | 10.56 | 9.63 | 9.42 | 38.64 | 38.06 |
| C | $C_{11}H_{36}N_4Si_5$ | 364.9 | 376, 356 | 36.21 | 36.13 | 9.94 | 9.80 | 15.36 | 15.30 | 38.50 | -------- |
| D | $C_{14}H_{44}N_4Si_6$ | 437.0 | 453, 444 | 38.48 | 38.53 | 10.15 | 10.01 | 12.82 | 12.78 | 38.57 | 38.80 |
| E | $C_{17}H_{52}N_4Si_7$ | 509.2 | 503, 508 | 40.08 | 40.45 | 10.29 | 10.25 | 11.03 | 11.30 | 38.61 | 38.95 |
| G | $C_{39}H_{41}N_3Si_4$ | 664.1 | 696 | 70.53 | 71.09 | 6.22 | 6.32 | 6.32 | 6.32 | 16.91 | 14.97 |
| F | $C_{10}H_{30}N_2Si_4$ | 290.7 | 294 | 41.31 | 41.70 | 10.40 | 10.48 | 9.65 | 9.57 | 38.64 | 38.12 |
| H | $C_{42}H_{48}N_3Cl_3Si_6$ | -------- | -------- | -------- | -------- | -------- | -------- | 4.83 | 5.04 | -------- | -------- |

EXAMPLE 9

A sample of 100 ml. of n-butyl-lithium (6.07 N) is reacted with 44 g. of octamethylcyclotetrasilazane (150 mmol) in 300 ml. of n-hexane. The lithium salt is heated with 65.2 g. $(CH_3)_3SiCl$ (600 mmol) for five hours at 160° C. The weight of LiCl deposited is 23.0 g. (90.5%). Gas chromatography showed evidence of four substances which on careful fractionation were identified as 15.80 g. (18%) of (Compound No. F) N,N'-bis-(trimethylsilyl)-tetramethylcyclodisilazane, 22.0 g. of (Compound No. D) N,N'-bis-(trimethylsilyl)-octamethylcyclotetrasilazane (25%), 8.0 g. of (Compound No. E) N,N'N''-tris-(trimethylsilyl)-octamethylcyclotetrasilazane (9.1%) and 3.86 g. of another compound B.P.$_{0.3}$ 195° C., $n_D^{20}$ 1.4690.

EXAMPLE 10

A sample of 46.0 g. of the monolithium salt of hexaphenylcyclotrisilazane (77.1 mmol) dissolved in 50–100 ml. of benzene and 8.36 g. $(CHC_3)_3SiCl$ (77.1 mmol) are reacted at 150–180° C. for 5–6 hours. LiCl: 3:15 g.=96.8% conversion. Fractional distillation gave 35.9 g. of (Compound No. G) N-trimethylsilyl-hexaphenylcyclotrisilazane (70.1%) and 6.4 g. of hexaphenylcyclotrisilazane (12.5%). Compound G has a softening point of 80° C. and a B.P.$_1$ of 293–300° C.

EXAMPLE 11

The trilithium salt of hexaphenylcyclotrisilazane and a calculated amount of $(CH_3)_2SiCl_2$ are reacted at

What is claimed is:

1. A cyclic nitrogen-silicon compound of the formula

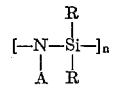

wherein A is selected from the group consisting of hydrogen and R'$_3$Si radicals, provided not all of the A's are hydrogen, R is selected from the group consisting of monovalent hydrocarbon radicals having not more than 18 carbon atoms, and fluorinated derivatives thereof, R' is selected from the group consisting of R, halogens and (R$_3$Si)$_2$N groups, and n is an integer of from 2 to 4.

2. A compound of claim 1 wherein R and R' are alkyl radicals having not more than 8 carbon atoms, and n is an integer from 2 to 4.

3. A compound of claim 1 wherein R is an aromatic hydrocarbon radical having not more than 8 carbon atoms, R' is an alkyl radical having not more than 8 carbon atoms, and n is an integer from 2 to 4.

4. A compound of claim 1 wherein R is CF$_3$, R' is an alkyl radical having not more than 8 carbon atoms, and n is an integer from 2 to 4.

5. N,N-bistrimethylsilyl-hexamethylcyclotrisilazane.
6. N,N'-bistrimethylsilyl-tetramethylcyclodisilazane.
7. N,N'-bistrimethylsilyl-octamethylcyclotetrasilazane.
8. N,N',N'' - tristrimethylsilyl - hexaphenylcyclotrisilazane.
9. N-trimethylsilyl-hexaphenylcyclotrisilazane.

(References on following page)

References Cited by the Examiner

Goubeau et al., "Z. fur Anorg. und Allgemeine Chemie," vol. 303, March 1960, pages 217–26.

Larsson et al., "Act. Chem. Scand.," vol. 3 (1949), pp. 487–92.

Niederprum, "Beitrage zur Kenntnis der Silicium-Stickstoff-Verbindungen," dissertation submitted to the Rheinisch-Westfalischen Technischen Hochschule Aachen, Germany, Nov. 9, 1960, title pages and pages 46–67 only needed.

Pflugmacher et al., "Z fur Anorganische und Allgemeine Chemie," vol. 290 (May 1957), pp. 184–90.

Schumb et al., "Jour. Am. Chem Soc.," vol. 75 (December 1953), pp. 6085–6.

Wannagat et al. II, "Angewandte Chemie," vol. 71, 1959, page 574.

Wannagat et al., ibid., vol. 308 (March 1961), pp. 337–51.

TOBIAS E. LEVOW, *Primary Examiner.*

SAMUEL H. BLECH, *Examiner.*